United States Patent
Mousa

(10) Patent No.: US 9,283,825 B2
(45) Date of Patent: Mar. 15, 2016

(54) SYSTEM, METHOD, AND APPARATUS TO PREVENT COMMERCIAL VEHICLE ROLLOVER

(71) Applicant: Isam Mousa, San Carlos, CA (US)

(72) Inventor: Isam Mousa, San Carlos, CA (US)

(*) Notice: Subject to any disclaimer, the term of this patent is extended or adjusted under 35 U.S.C. 154(b) by 0 days.

(21) Appl. No.: 14/631,833

(22) Filed: Feb. 25, 2015

(65) Prior Publication Data

US 2015/0239409 A1 Aug. 27, 2015

Related U.S. Application Data

(60) Provisional application No. 61/966,505, filed on Feb. 25, 2014.

(51) Int. Cl.

| B60R 16/023 | (2006.01) |
|---|---|
| B60G 17/019 | (2006.01) |
| B60G 17/016 | (2006.01) |

(Continued)

(52) U.S. Cl.
CPC ...... *B60G 17/01933* (2013.01); *B60G 17/0162* (2013.01); *B60G 17/01908* (2013.01); *B62D 49/08* (2013.01); *B62D 61/12* (2013.01); *B60G 2300/02* (2013.01); *B60G 2400/0511* (2013.01);

(Continued)

(58) Field of Classification Search
CPC ............. B60R 16/0233; B60G 17/01933; B60G 17/016; B60G 17/0155; B60G 17/01908; B60G 2800/0124; B62D 49/00
USPC ......................................................... 701/45
See application file for complete search history.

(56) References Cited

U.S. PATENT DOCUMENTS

| 3,578,377 A | 5/1971 | Babbitt, Jr. et al. |
| 3,609,313 A | 9/1971 | Lucien |

(Continued)

FOREIGN PATENT DOCUMENTS

| CN | 102328563 B | 5/2013 |
| EP | 0607516 A2 | 7/1994 |

(Continued)

OTHER PUBLICATIONS

"Large Truck and Bus Crash Facts 2012", U.S. Department of Transportation, Jun. 2014 by Federal Motor Carrier Safety Administration Analysis Division (pp. 84).

(Continued)

*Primary Examiner* — Rodney Butler
*Assistant Examiner* — Anne Mazzara
(74) *Attorney, Agent, or Firm* — Raj Abhyanker, P.C.

(57) ABSTRACT

A rollover prevention apparatus includes a primary hydraulic cylinder attached to a frame bracket, a secondary hydraulic cylinder attached to the primary hydraulic cylinder and a wheel bracket. The rollover prevention apparatus includes a stabilizing wheel affixed to the wheel bracket. The stabilizing wheel is substantially in line with a plurality of wheels affixed to the frame while the primary and secondary hydraulic cylinders are retracted, the line being substantially perpendicular to the primary and secondary hydraulic cylinders. The stabilizing wheel has a negative camber angle with respect to the plurality of wheels while the primary and secondary hydraulic cylinders are retracted. A rollover event may be averted by extending the primary and secondary hydraulic cylinders such that the stabilizing wheel makes contact with a road without substantially leaving a lane, and using the secondary hydraulic cylinder to push against the road until the rollover event has been averted.

20 Claims, 8 Drawing Sheets

(51) Int. Cl.
  *B62D 49/08* (2006.01)
  *B60G 17/015* (2006.01)
  *B62D 61/12* (2006.01)

(52) U.S. Cl.
  CPC . *B60G 2800/0124* (2013.01); *B60G 2800/9124* (2013.01)

(56) References Cited

U.S. PATENT DOCUMENTS

| | | | |
|---|---|---|---|
| 3,838,783 A | 10/1974 | Tune | |
| 3,866,942 A | 2/1975 | Cheetham et al. | |
| 4,386,674 A | 6/1983 | Sugata | |
| 4,480,714 A | 11/1984 | Yabuta et al. | |
| 4,666,183 A | 5/1987 | Azzarello | |
| 4,927,173 A | 5/1990 | Clifton, Jr. | |
| 5,383,680 A | 1/1995 | Bock et al. | |
| 5,610,575 A | 3/1997 | Tony Gioutsos | |
| 5,825,284 A | 10/1998 | Dunwoody et al. | |
| 5,835,873 A | 11/1998 | Darby et al. | |
| 5,890,084 A | 3/1999 | Halasz et al. | |
| 5,899,949 A | 5/1999 | Kincaid | |
| 6,002,974 A | 12/1999 | Schiffmann | |
| 6,002,975 A | 12/1999 | Schiffmann et al. | |
| 6,055,472 A | 4/2000 | Breunig et al. | |
| 6,081,188 A * | 6/2000 | Kutlucinar et al. | 340/438 |
| 6,081,761 A | 6/2000 | Harada et al. | |
| 6,141,604 A | 10/2000 | Mattes et al. | |
| 6,169,946 B1 | 1/2001 | Griessbach | |
| 6,170,594 B1 | 1/2001 | Gilbert | |
| 6,178,368 B1 | 1/2001 | Otake | |
| 6,192,305 B1 | 2/2001 | Schiffmann | |
| 6,212,455 B1 | 4/2001 | Weaver | |
| 6,225,894 B1 | 5/2001 | Kyrtsos | |
| 6,263,261 B1 | 7/2001 | Brown et al. | |
| 6,282,474 B1 | 8/2001 | Chou et al. | |
| 6,292,759 B1 | 9/2001 | Schiffmann | |
| 6,301,536 B1 | 10/2001 | Vaessen et al. | |
| 6,311,111 B1 | 10/2001 | Leimbach et al. | |
| 6,312,013 B1 | 11/2001 | Baur et al. | |
| 6,324,446 B1 | 11/2001 | Brown et al. | |
| 6,332,104 B1 | 12/2001 | Brown et al. | |
| 6,349,247 B1 | 2/2002 | Schramm et al. | |
| 6,363,306 B1 | 3/2002 | Palmertz et al. | |
| 6,384,719 B1 | 5/2002 | Dieckmann | |
| 6,397,133 B1 | 5/2002 | van der Pol et al. | |
| 6,433,681 B1 | 8/2002 | Foo et al. | |
| 6,496,758 B2 | 12/2002 | Rhode et al. | |
| 6,496,759 B1 | 12/2002 | Mattes et al. | |
| 6,496,763 B2 | 12/2002 | Griessbach | |
| 6,529,803 B2 | 3/2003 | Meyers et al. | |
| 6,529,811 B2 | 3/2003 | Watson et al. | |
| 6,542,073 B2 | 4/2003 | Yeh et al. | |
| 6,542,792 B2 | 4/2003 | Schubert et al. | |
| 6,560,519 B2 | 5/2003 | Williams et al. | |
| 6,584,388 B2 | 6/2003 | Schubert et al. | |
| 6,588,799 B1 * | 7/2003 | Sanchez | 280/755 |
| 6,594,570 B2 | 7/2003 | Nagao et al. | |
| 6,614,343 B1 | 9/2003 | Fennel et al. | |
| 6,618,656 B2 | 9/2003 | Kueblbeck et al. | |
| 6,631,317 B2 | 10/2003 | Lu et al. | |
| 6,654,671 B2 | 11/2003 | Schubert | |
| 6,678,631 B2 | 1/2004 | Schiffmann | |
| 6,684,140 B2 | 1/2004 | Lu | |
| 6,694,225 B2 | 2/2004 | Aga et al. | |
| 6,697,726 B2 | 2/2004 | Takagi et al. | |
| 6,714,848 B2 | 3/2004 | Schubert et al. | |
| 6,741,922 B2 | 5/2004 | Holler | |
| 6,755,274 B2 | 6/2004 | Mattes et al. | |
| 6,819,980 B2 | 11/2004 | Bauer et al. | |
| 6,834,218 B2 | 12/2004 | Meyers et al. | |
| 6,843,538 B1 | 1/2005 | Nagae et al. | |
| 6,850,156 B2 | 2/2005 | Bloomfield et al. | |
| 6,851,711 B2 | 2/2005 | Goertzen et al. | |
| 6,922,622 B2 | 7/2005 | Dulin et al. | |
| 6,938,924 B2 | 9/2005 | Feldman | |
| 6,954,140 B2 | 10/2005 | Holler | |
| 7,020,552 B2 | 3/2006 | Park | |
| 7,027,902 B2 | 4/2006 | Lu et al. | |
| 7,031,816 B2 | 4/2006 | Lehmann et al. | |
| 7,057,503 B2 | 6/2006 | Watson | |
| 7,085,637 B2 | 8/2006 | Breed et al. | |
| 7,149,614 B2 | 12/2006 | Traechtler et al. | |
| 7,162,340 B2 | 1/2007 | Schubert et al. | |
| 7,162,343 B2 | 1/2007 | Subbian et al. | |
| 7,191,047 B2 | 3/2007 | Chen et al. | |
| 7,213,670 B2 | 5/2007 | Iyoda et al. | |
| 7,222,010 B2 | 5/2007 | Suzuki et al. | |
| 7,233,235 B2 | 6/2007 | Pavlish | |
| 7,261,303 B2 | 8/2007 | Stefan et al. | |
| 7,277,787 B2 | 10/2007 | Salib et al. | |
| 7,353,098 B2 | 4/2008 | Sakata | |
| 7,369,927 B2 | 5/2008 | Hille et al. | |
| 7,386,384 B2 | 6/2008 | Le et al. | |
| 7,438,317 B2 | 10/2008 | Röhner et al. | |
| 7,463,963 B2 | 12/2008 | Higuchi | |
| 7,463,965 B2 | 12/2008 | Sakata | |
| 7,477,972 B2 | 1/2009 | Stavroff et al. | |
| 7,483,776 B2 | 1/2009 | Lich | |
| 7,502,675 B2 | 3/2009 | Hac et al. | |
| 7,522,982 B2 | 4/2009 | Le et al. | |
| 7,613,555 B2 | 11/2009 | Takeda | |
| 7,640,081 B2 | 12/2009 | Lu et al. | |
| 7,653,471 B2 | 1/2010 | Mattson et al. | |
| 7,698,036 B2 | 4/2010 | Watson et al. | |
| 7,702,440 B2 | 4/2010 | Wu et al. | |
| 7,715,965 B2 | 5/2010 | Messih et al. | |
| 7,731,216 B2 | 6/2010 | Cornish | |
| 7,734,394 B2 | 6/2010 | Williams | |
| 7,788,007 B2 | 8/2010 | Moshchuk et al. | |
| 7,859,392 B2 | 12/2010 | McClellan et al. | |
| 7,899,594 B2 | 3/2011 | Messih et al. | |
| 8,005,596 B2 | 8/2011 | Lu et al. | |
| 8,014,922 B2 | 9/2011 | Le et al. | |
| 8,019,514 B2 | 9/2011 | Yuet et al. | |
| 8,050,857 B2 | 11/2011 | Lu et al. | |
| 8,095,269 B2 | 1/2012 | Pruett et al. | |
| 8,108,104 B2 | 1/2012 | Hrovat et al. | |
| 8,185,272 B2 | 5/2012 | Schmid et al. | |
| 8,219,282 B2 | 7/2012 | Lu et al. | |
| 8,315,765 B2 | 11/2012 | Gerdes et al. | |
| 8,346,433 B2 | 1/2013 | Lu et al. | |
| 8,346,439 B2 | 1/2013 | Andres et al. | |
| 8,355,852 B2 | 1/2013 | Grimm et al. | |
| 8,442,720 B2 | 5/2013 | Lu et al. | |
| 8,489,287 B2 | 7/2013 | Hsu et al. | |
| 8,500,167 B2 | 8/2013 | Diaz | |
| 8,560,217 B2 | 10/2013 | Sverrisson | |
| 8,630,768 B2 | 1/2014 | McClellan et al. | |
| 8,634,989 B1 | 1/2014 | Schramm | |
| 8,725,353 B2 | 5/2014 | Lu et al. | |
| 8,825,277 B2 | 9/2014 | McClellan et al. | |
| 8,892,341 B2 | 11/2014 | McClellan | |
| 8,902,055 B2 | 12/2014 | Holbert et al. | |
| 8,935,048 B2 | 1/2015 | Sun | |
| 9,008,854 B2 | 4/2015 | Breed | |
| 9,050,997 B1 | 6/2015 | Schramm | |
| 2002/0082749 A1 | 6/2002 | Meyers et al. | |
| 2002/0087235 A1 | 7/2002 | Aga et al. | |
| 2002/0149161 A1 | 10/2002 | Smith | |
| 2003/0004627 A1 | 1/2003 | Williams et al. | |
| 2003/0023359 A1 | 1/2003 | Kueblbeck et al. | |
| 2003/0088349 A1 | 5/2003 | Schubert et al. | |
| 2003/0093201 A1 | 5/2003 | Schubert et al. | |
| 2003/0158633 A1 | 8/2003 | Schubert | |
| 2003/0163231 A1 | 8/2003 | Meyers et al. | |
| 2003/0182041 A1 | 9/2003 | Watson | |
| 2003/0213636 A1 | 11/2003 | Feldman | |
| 2003/0225499 A1 | 12/2003 | Holler | |
| 2004/0064236 A1 | 4/2004 | Lu et al. | |
| 2004/0064246 A1 | 4/2004 | Lu et al. | |
| 2004/0102894 A1 | 5/2004 | Holler | |
| 2004/0128060 A1 | 7/2004 | Park | |
| 2004/0162654 A1 | 8/2004 | Lu et al. | |

(56) References Cited

U.S. PATENT DOCUMENTS

| | | | |
|---|---|---|---|
| 2004/0254703 | A1 | 12/2004 | Traechtler et al. |
| 2004/0254707 | A1 | 12/2004 | Lu et al. |
| 2005/0006166 | A1 | 1/2005 | Cho |
| 2005/0015191 | A1 | 1/2005 | Banno et al. |
| 2005/0102085 | A1 | 5/2005 | Sakata |
| 2005/0110227 | A1 | 5/2005 | Stefan et al. |
| 2005/0154512 | A1 | 7/2005 | Schubert et al. |
| 2005/0159864 | A1 | 7/2005 | Ogata et al. |
| 2005/0187687 | A1 | 8/2005 | Geborek et al. |
| 2005/0209757 | A1 | 9/2005 | Kueblbeck et al. |
| 2005/0216154 | A1 | 9/2005 | Lehmann et al. |
| 2005/0216163 | A1 | 9/2005 | Sakata |
| 2005/0222728 | A1 | 10/2005 | Hac et al. |
| 2006/0058934 | A1 | 3/2006 | Le et al. |
| 2006/0064218 | A1 | 3/2006 | Subbian et al. |
| 2006/0085111 | A1 | 4/2006 | Kojima |
| 2006/0095181 | A1 | 5/2006 | Darvish |
| 2006/0095182 | A1 | 5/2006 | Lahmann et al. |
| 2006/0129298 | A1 | 6/2006 | Takeda |
| 2006/0184299 | A1 | 8/2006 | Wu et al. |
| 2006/0184300 | A1 | 8/2006 | Schubert et al. |
| 2006/0184301 | A1 | 8/2006 | Konno et al. |
| 2006/0229790 | A1 | 10/2006 | Le et al. |
| 2007/0106443 | A1 | 5/2007 | Lu |
| 2007/0162202 | A1 | 7/2007 | Moshchuk et al. |
| 2007/0205578 | A1 | 9/2007 | Cornish |
| 2008/0077289 | A1 | 3/2008 | Fujishima |
| 2008/0208416 | A1 | 8/2008 | Yuet et al. |
| 2009/0150021 | A1 | 6/2009 | Le et al. |
| 2010/0185354 | A1 | 7/2010 | Pruett et al. |
| 2010/0191423 | A1 | 7/2010 | Koyama et al. |
| 2011/0071719 | A1 | 3/2011 | Andres et al. |
| 2012/0035784 | A1 | 2/2012 | Gauger |
| 2012/0098243 | A1* | 4/2012 | Diaz .......................... 280/766.1 |
| 2013/0151027 | A1* | 6/2013 | Petrucci et al. ................... 701/1 |
| 2013/0184936 | A1 | 7/2013 | Lu et al. |
| 2014/0058625 | A1 | 2/2014 | Sun |
| 2014/0081542 | A1 | 3/2014 | Yao et al. |
| 2014/0222299 | A1 | 8/2014 | Stander et al. |
| 2015/0266503 | A1 | 9/2015 | Schramm |

FOREIGN PATENT DOCUMENTS

| | | |
|---|---|---|
| EP | 1110834 A3 | 8/2002 |
| EP | 1682335 A1 | 7/2006 |
| WO | 03081180 A2 | 10/2003 |
| WO | 2008105997 A1 | 9/2008 |

OTHER PUBLICATIONS

"Traffic Incident Management in Hazardous Materials Spills in Incident Clearance", Jan. 2009, U.S. Department of Transportation Federal Highway Administration (pp. 56).

"Volvo Enhanced Stability Technology (VEST)", Making Safe Drivers Safer, 2007 by The Volvo Group, Inc. (pp. 2).

"UMTRI Fifth-Wheel Load Transducer—User's Guide", The University of Michigan, Transportation Research Institute, Aug. 1998 by C.B. Winkler (pp. 12).

"Oil Train Derailments Pose Huge Risks", Energy & Capital, Aug. 7, 2015 by Keith Kohl (pp. 4).

"Evaluating the Effectiveness of Electronic Stability Systems in Reducing Truck Rollovers" Faculty of the Virginia Polytechnic Institute, Dec. 3, 2010 by Kelly Donoughe (pp. 70).

"Federal Motor Vehicle Safety Standards—Electronic Stability Control Systems for Heavy Vehicles", National Highway Traffic Safety Administration (NHTSA), Apr. 11, 2000, by Department of Transportation (pp. 190).

"Road Map for the Future Making the Case for Full-Stability", Bendix Commercial Vehicle Systems LLC, 2008, by Fred Andersky et al. pp. (48).

"The Economic and Societal Impact of Motor Vehicle Crashes, 2010 (Revised)", National Highway Traffic Safety Administration, May 2015, by Blincoe, L. J., et al. pp. (304).

"13 cars fall off tracks after derailment in Old Town Spring", Click 2 Houston.com, Aug. 10, 2015, by Jennifer Bauer pp. (2).

"A Method for Reducing On-Road Rollovers—Anti-Rollover Braking", SAE International, Mar. 1, 1999 by Thomas J. Wielenga (p. 1).

"Model-Based Design of a SUV anti-rollover control system", The MathWorks, Inc. & Mechanical Simulation Corporation, Jan. 2008 by Vinod Cherian et al. (pp. 6).

"Intelligent Prediction and Prevention of Vehicle Rollover Using NNLQG Regulator", International Journal of Electrical and Electronic Engineering and Telecommunications, vol. 4, No. 1, Jan. 2015 by M.B. Binda et al. (pp. 9).

"Rollover Prevention", Mainroads Western Australia, Oct. 30, 2014 (p. 1).

"Vehicle Roll-over", IRTE, a Professional Sector of SOE, Apr. 2011 by Nicholas Edwards (pp. 16).

"Rollover Prevention for Sports Utility Vehicles With Human-in-the-Loop Evaluations", Proceedings of AVEC, University of Michigan, Aug. 22-24, 2000 by Bo-Chivan Chen et al. (pp. 8).

"A seat at the TIM Table", T&R Footnotes, Aug. 2008 by Thomson G Dolan (pp. 23).

* cited by examiner

SYSTEM, METHOD, AND APPARATUS TO PREVENT COMMERCIAL VEHICLE ROLLOVER

CLAIM OF PRIORITY

This application is a non-provisional conversion application and claims benefit of U.S. Provisional Application No. 61/966,505 titled PROJECT UPRIGHT filed on Feb. 25, 2014.

FIELD OF TECHNOLOGY

This disclosure relates generally to automotive technology and, more particularly, to a method, a device and/or a system to prevent the rollover of commercial vehicles.

BACKGROUND

Rollovers of heavy, commercial vehicles may be expensive and dangerous. When a commercial vehicle (e.g. semi trailers, tankers, a cement mixers etc.) rolls over, the impact may be devastating. Righting the vehicle can be expensive and may cause damage to the vehicle. Cargo may be damaged or destroyed, sometimes having a large environmental impact (e.g. spilled fuel, etc.). The traffic consequences may impact a large number of people. And most of all, rollovers can result in severe injury or death for both the driver and other people on the road.

Rollovers may be caused by many factors. The most common factor is a failure to adjust speed correctly for the type of load being carried, especially on interstate on-and-off ramps. The second most common cause of rollovers is distracted or sleeping drivers. Over-steering, lack of experience, and unbalanced loads also cause rollovers.

SUMMARY

Disclosed are a system, method, and apparatus to prevent commercial vehicle rollover. In one aspect, a rollover prevention apparatus includes a primary hydraulic cylinder attached to a frame bracket, a secondary hydraulic cylinder attached to the primary hydraulic cylinder and a wheel bracket. The rollover prevention apparatus further includes a stabilizing wheel affixed to the wheel bracket.

The frame bracket is affixed to a frame such that the primary hydraulic cylinder is at an upward angle. Furthermore, the stabilizing wheel is substantially in line with a plurality of wheels affixed to the frame while the primary hydraulic cylinder and the secondary hydraulic cylinders are retracted, the line being substantially perpendicular to the primary hydraulic cylinder and the secondary hydraulic cylinders. The stabilizing wheel has a negative camber angle with respect to the plurality of wheels while the primary hydraulic cylinder and the secondary hydraulic cylinders are retracted. Also, a rollover event may be averted by extending the primary hydraulic cylinder and the secondary hydraulic cylinders such that the stabilizing wheel makes contact with a road without substantially leaving a lane, and further using at least the secondary hydraulic cylinder to push against the road until the rollover event has been averted.

The rollover prevention apparatus may include a hydraulic power pack to pressurize a hydraulic fluid such that the hydraulic power pack to enable the primary hydraulic cylinder and the secondary hydraulic cylinder function as specified when the rollover event is detected, a hydraulic fluid supply to provide the hydraulic fluid to the primary hydraulic cylinder and the secondary hydraulic cylinder, and/or a compressed air tank to provide compressed air to the primary hydraulic cylinder and the secondary hydraulic cylinder to increase responsiveness when the rollover event is detected. The apparatus may also include an external warning system to alert nearby drivers when the apparatus is being used. Furthermore, the rollover prevention apparatus may include a braking system connected to the stabilizing wheel. The primary hydraulic cylinder and/or the secondary hydraulic cylinder may be an air-over-hydraulic cylinder. Also, an angle between the frame and the primary hydraulic cylinder and/or an angle between the primary hydraulic cylinder and the secondary hydraulic cylinder may be adjustable.

In another aspect, a method of a rollover prevention system includes detecting a potential rollover event, extending a primary hydraulic cylinder and a secondary hydraulic cylinder such that a stabilizing wheel makes contact with a road, further extending the secondary hydraulic cylinder until the potential rollover event has been averted, and retracting the primary hydraulic cylinder and the secondary hydraulic cylinders. The potential rollover event may be detected using a tilt sensor, a plurality of weight sensors, a plurality of wheel speed sensors, and/or a terrain sensor.

The method may include determining a location using a GPS receiver, and reporting the location to a server using a cellular modem in response to the potential rollover event and/or the extension of the hydraulic cylinders. The method may further include alerting a driver of the potential rollover event using a sound generator, a light, and/or an instrument. The method may also include alerting nearby drivers of the extending of the primary hydraulic cylinder and the secondary hydraulic cylinders using a sound generator and/or a light. The extension of the primary hydraulic cylinder and the secondary hydraulic cylinders may be triggered automatically, in response to the detection of a potential rollover event. Finally, the primary hydraulic cylinder and the secondary hydraulic cylinders may be extended distances which may be determined by a critical angle, a lane size, and/or a load weight.

In yet another aspect, a rollover prevention system includes a rollover event sensor, a rollover prevention controller, including a processor and a memory, and a rollover prevention apparatus. The rollover prevention system may also include an external warning system including a sound generator and/or a light, configured to alert nearby drivers when a rollover prevention apparatus is being deployed. The deployment of the rollover prevention apparatus may be triggered automatically by the rollover prevention controller, in response to the detection of a potential rollover event through the rollover event sensor.

The method, apparatus, and system disclosed herein may be implemented in any means for achieving various aspects, and may be executed in a form of a non-transitory machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the Figures of the accompanying drawings, in which like references indicate similar elements and in which.

Figure 1:
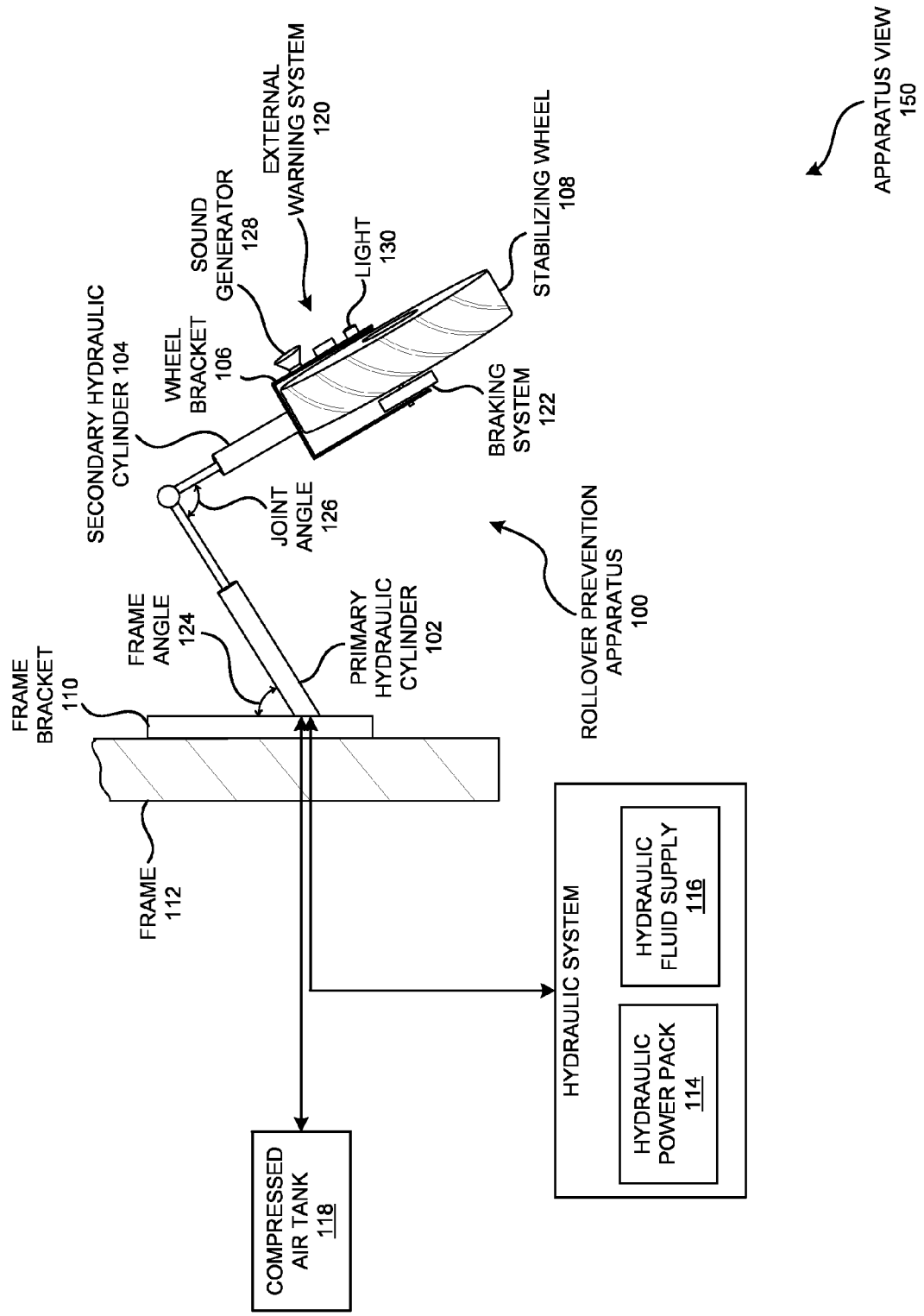
FIG. 1 is an apparatus view illustrating a rollover prevention apparatus attached to a frame of a vehicle, according to one embodiment.

Other features of the present embodiments will be apparent from the accompanying drawings and from the detailed description that follows.

DETAILED DESCRIPTION

Example embodiments, as described below, may be used to provide a system, method, and/or apparatus to prevent commercial vehicle rollover.

In one embodiment, a rollover prevention apparatus 100 includes a primary hydraulic cylinder 102 attached to a frame bracket 110, a secondary hydraulic cylinder 104 attached to the primary hydraulic cylinder 102 and a wheel bracket 106. The rollover prevention apparatus 100 further includes a stabilizing wheel 108 affixed to the wheel bracket 106.

The frame bracket 110 is affixed to a frame 112 such that the primary hydraulic cylinder 102 is at an upward angle 208. Furthermore, the stabilizing wheel 108 is substantially in line with a plurality of wheels 206 affixed to the frame 112 while the primary hydraulic cylinder 102 and the secondary hydraulic cylinders 104 are retracted, the line being substantially perpendicular to the primary hydraulic cylinder 102 and the secondary hydraulic cylinders 104. The stabilizing wheel 108 has a negative camber angle 210 with respect to the plurality of wheels 206 while the primary hydraulic cylinder 102 and the secondary hydraulic cylinders 104 are retracted. Also, a rollover event 200 may be averted by extending the primary hydraulic cylinder 102 and the secondary hydraulic cylinders 104 such that the stabilizing wheel 108 makes contact with a road 202 without substantially leaving a lane 204, and further using at least the secondary hydraulic cylinder 104 to push against the road 202 until the rollover event 200 has been averted.

The rollover prevention apparatus 100 may include a hydraulic power pack 114 to pressurize a hydraulic fluid such that the hydraulic power pack 114 to enable the primary hydraulic cylinder 102 and the secondary hydraulic cylinder 104 function as specified when the rollover event 200 is detected, a hydraulic fluid supply 116 to provide the hydraulic fluid to the primary hydraulic cylinder 102 and the secondary hydraulic cylinder 104, and/or a compressed air tank 118 to provide compressed air to the primary hydraulic cylinder 102 and the secondary hydraulic cylinder 104 to increase responsiveness when the rollover event 200 is detected. The apparatus may also include an external warning system 120 to alert nearby drivers when the apparatus is being used. Furthermore, the rollover prevention apparatus 100 may include a braking system 122 connected to the stabilizing wheel 108. The primary hydraulic cylinder 102 and/or the secondary hydraulic cylinder 104 may be an air-over-hydraulic cylinder. Also, an angle between the frame 112 and the primary hydraulic cylinder 102 and/or an angle between the primary hydraulic cylinder 102 and the secondary hydraulic cylinder 104 may be adjustable.

In another embodiment, a method of a rollover prevention system 600 includes detecting a potential rollover event 200, extending a primary hydraulic cylinder 102 and a secondary hydraulic cylinder 104 such that a stabilizing wheel 108 makes contact with a road 202, further extending the secondary hydraulic cylinder 104 until the potential rollover event 200 has been averted, and retracting the primary hydraulic cylinder 102 and the secondary hydraulic cylinders 104. The potential rollover event 200 may be detected using a tilt sensor 616, a plurality of weight sensors 618, a plurality of wheel speed sensors 620, and/or a terrain sensor 622.

The method may include determining a location using a GPS receiver 610, and reporting the location to a server using a cellular modem 612 in response to the potential rollover event 200 and/or the extension of the hydraulic cylinders. The method may further include alerting a driver of the potential rollover event 200 using a sound generator 128, a light 130, and/or an instrument 626. The method may also include alerting nearby drivers of the extending of the primary hydraulic cylinder 102 and the secondary hydraulic cylinders 104 using a sound generator 128 and/or a light 130. The extension of the primary hydraulic cylinder 102 and the secondary hydraulic cylinders 104 may be triggered automatically, in response to the detection of a potential rollover event 200. Finally, the primary hydraulic cylinder 102 and the secondary hydraulic cylinders 104 may be extended distances which may be determined by a critical angle 201, a lane 204 size, and/or a load weight.

In yet another embodiment, a rollover prevention system 600 includes a rollover event sensor 604, a rollover prevention controller 602, including a processor 606 and a memory 608, and a rollover prevention apparatus 100. The rollover prevention system 600 may also include an external warning system 120 including a sound generator 128 and/or a light 130, configured to alert nearby drivers when a rollover prevention apparatus 100 is being deployed. The deployment of the rollover prevention apparatus 100 may be triggered automatically by the rollover prevention controller 602, in response to the detection of a potential rollover event 200 through the rollover event sensor 604.

FIG. 1 is an apparatus view 150 illustrating a rollover prevention apparatus 100 attached to a frame 112 of a vehicle, according to one embodiment. Particularly, FIG. 1 illustrates a rollover prevention apparatus 100, a primary hydraulic cylinder 102, a secondary hydraulic cylinder 104, a wheel bracket 106, a stabilizing wheel 108, a frame bracket 110, a frame 112, a hydraulic power pack 114, a hydraulic fluid supply 116, a compressed air tank 118, an external warning system 120, a braking system 122, an angle between the frame 112 and the primary hydraulic cylinder 102, an angle between the primary hydraulic cylinder 102 and the secondary hydraulic cylinder 104, a sound generator 128, and a light 130, according to one embodiment.

A rollover prevention apparatus 100 may be an apparatus designed to prevent a vehicle from overturning. A primary hydraulic cylinder 102 may be a mechanical actuator that is used to give a unidirectional force through a unidirectional stroke, powered by pressurized hydraulic fluid. A secondary hydraulic cylinder 104 may be a mechanical actuator that is used to give a unidirectional force through a unidirectional stroke, powered by pressurized hydraulic fluid.

A wheel bracket 106 may be a supporting material through which the stabilizing wheel 108 is coupled to the secondary hydraulic cylinder 104. In some embodiments, the wheel bracket 106 may also support a brake system for the stabilizing wheel 108. In other embodiments, the manner in which the wheel bracket 106 is attached to the secondary hydraulic cylinder 104 may allow for a small amount of side to side and/or spinning of the stabilizing wheel 108. This may allow the stabilizing wheel 108, after being deployed, work with motions of the vehicle rather than fight against them.

A stabilizing wheel 108 may be a wheel used to stabilize a vehicle which could potentially roll over. In some embodiments, the stabilizing wheel 108 is a standard truck wheel, possible two wheels working in tandem. In other embodiments, the stabilizing wheel 108 may be a single wheel. As a specific example, in one embodiment, the stabilizing wheel 108 may be a wheel designed for use in the landing gear of a large aircraft. Such a wheel may provide the strength and form factor ideal for a rollover prevention apparatus 100.

A frame 112 may be the main supporting structure within a vehicle or trailer. For example, in some trailers, one or more frame 112 rails may run the length of the vehicle. The axles of the vehicle may be attached to the frame 112 through leaf springs, as one specific example. A frame bracket 110 may be support meant to be attached to a frame 112. In various embodiments, the frame bracket 110 may be welded to the frame 112; additional items may then be welded and/or bolted to the frame bracket 110.

A hydraulic power pack 114 may be an active component of a hydraulic circuit which provides hydraulic energy. An example may be a hydraulic pump, which may convert mechanical power into hydraulic energy. A hydraulic fluid supply 116 may be a reservoir of hydraulic fluid to be used within a hydraulic circuit. For example, fluid may be drawn from the supply and pushed into the circuit to cause the extension of a piston. A compressed air tank 118 may be a container for storing compressed air.

An air-over-hydraulic cylinder may be a mechanical actuator that uses pressurized hydraulic fluid as well as compressed air to give a unidirectional force through a unidirectional stroke. An air-over-hydraulic cylinder has many attractive qualities, the foremost being that the use of air provides speed, while the use of hydraulic fluid provides strength.

An external warning system 120 may be a device or collection of devices whose purpose is to warn nearby drivers that the rollover prevention apparatus 100/system is about to be, or is being, deployed. Ideally, the deployment of the rollover prevention apparatus 100 should not interfere with vehicles in a neighboring lane 204 of traffic. However, in situations where the lanes 204 are narrow, or the specifics of the potential rollover event 200 require a greater extension of the primary and/or secondary hydraulic cylinders 104, the stabilizing wheel 108 may encroach on a neighboring lane 204. An external warning system 120 alerts nearby drivers that they may soon be sharing part of their lane 204 with a stabilizing wheel 108. This may be a disrupting event, but generally preferable to having a large vehicle overturn into the neighboring lane 204.

A braking system 122 may be a mechanical device which inhibits motion, and may slow or stop a moving vehicle or prevent its motion. One exemplary breaking system used in large vehicles is an air brake, which uses compressed air to apply pressure to a brake pad. An angle between the frame 112 and the primary hydraulic cylinder 102, ads well as an angle between the primary hydraulic cylinder 102 and the secondary hydraulic cylinder 104, may be a description of the orientation of one object, with respect to another.

A sound generator 128 may be a device which creates a sound adapted to get the attention of those who hear it. A light 130 may be a device which creates a visual stimulus which may be used to.

As shown, the primary hydraulic cylinder 102 is attached to the secondary hydraulic cylinder 104. In some embodiments, this junction may include a joint, allowing the angle between the two cylinders to be altered. This angle may be modified in accordance with the circumstances in which the host vehicle is being used. FIG. 1 also shows the primary hydraulic cylinder 102 is attached to the frame 112 through the frame bracket 110. In various embodiments, the frame bracket 110 may be welded to the frame 112, in accordance with legal requirements. In a preferred embodiment, the primary hydraulic cylinder 102 may be welded and bolted to the frame bracket 110. In one embodiment, the frame bracket 110 may be one inch thick steel.

The secondary hydraulic cylinder 104 is attached to the wheel bracket 106, which supports the stabilizing wheel 108. In various embodiments, the stabilizing wheel 108 may utilize a brake system. As an option, the brakes may be air brakes, and may utilize an ABS system.

In various embodiments, the rollover prevention apparatus 100 may have an independent hydraulic system and air supply. For example, in one embodiment, each rollover prevention apparatus 100 may have it's own hydraulic circuit. In this way, the response time is increased; the use of a centralized hydraulic system may not be responsive enough to deploy the stabilizing wheel 108 in time to prevent a rollover. In the same way, in one embodiment, each apparatus has an independent compress air tank, which may be utilized for an air-over-hydraulic system and/or an air brake system. As an option, the compressed air tank 118 may be charged by a compressed air system incorporated into the vehicle. In some embodiments, the apparatus may be entirely independent of other vehicle systems and resources, providing it's own hydraulic, electrical, and air power. In other embodiments, the apparatus may rely upon the vehicle to provide one or more of these resources.

In one embodiment, the rollover prevention apparatus 100 may be manually deployed by the vehicle's driver. As an option, the driver may deploy the rollover prevention apparatus 100 to lift the side of a vehicle off the ground, facilitating service and repair (e.g. changing a tire, etc.) In another embodiment, the deployment may be automatically triggered by one of a number of potential rollover events 200.

Figure 2:
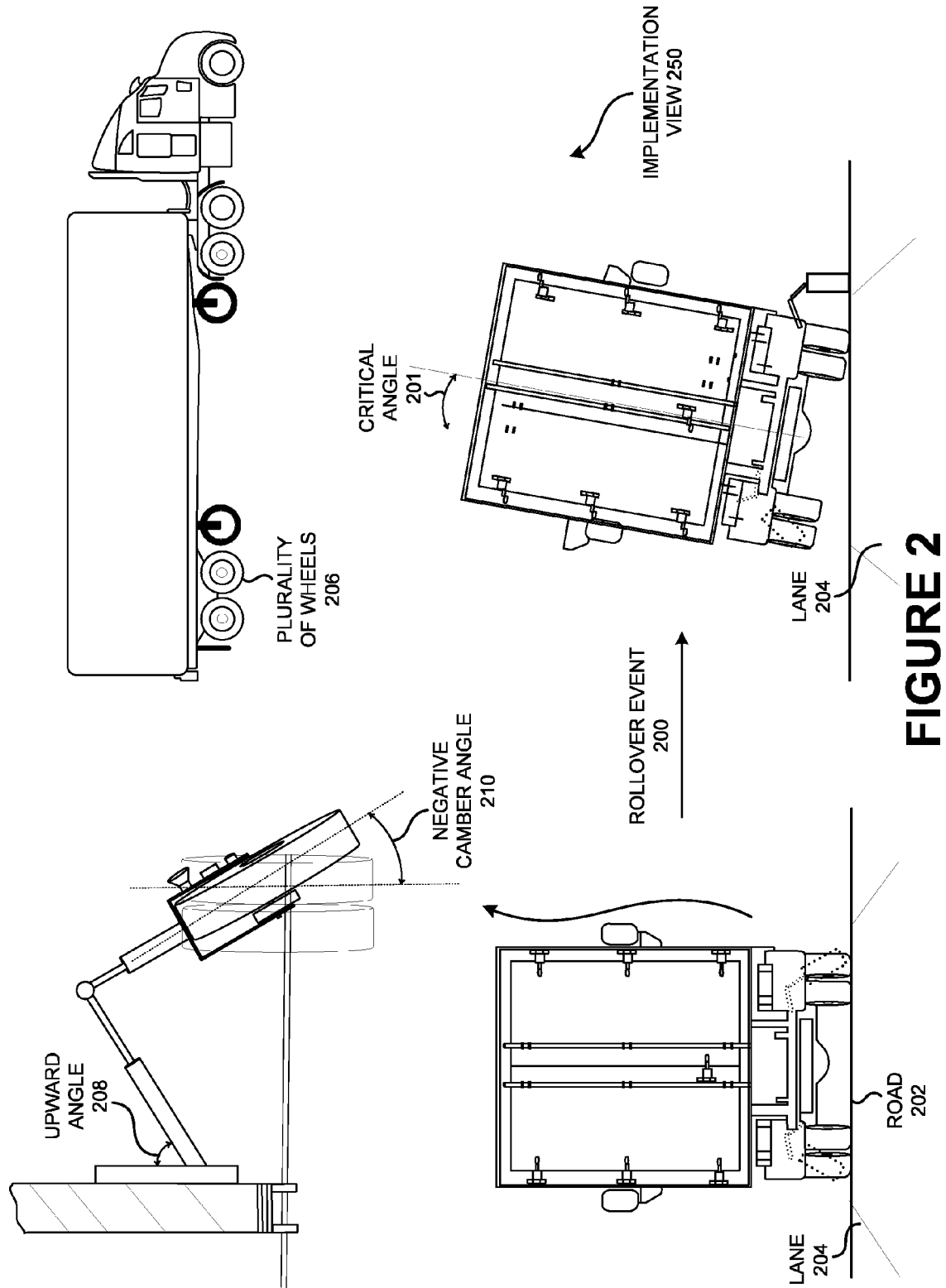
FIG. 2 is an implementation view of the rollover prevention apparatus of FIG. 1 being deployed to avert a rollover event, according to one embodiment.

FIG. 2 is an implementation view of the rollover prevention apparatus 100 of FIG. 1 being deployed to avert a rollover event 200, according to one embodiment. Particularly, FIG. 2 illustrates a rollover event 200, a critical angle 201, a road 202, a lane 204, a plurality of wheels 206, an upward angle 208, and a negative camber angle 210, in addition to the rollover prevention apparatus 100 of FIG. 1, in accordance to one embodiment.

A rollover event 200 may be an event in which a vehicle is overturned. A potential rollover event 200 may be a set of circumstances in which it is likely that a rollover may occur. One example of a potential rollover event 200 is the shifting of weight within the vehicle. When a load becomes off balance, the vehicle may handle in unpredictable ways and a normally safe turn can quickly become a rollover. weight sensors 618 may detect a shifting or unbalanced load, according to one embodiment.

Another example of a potential rollover event 200 is a change in tilt of the vehicle. According to various embodiments, the amount of tilt as well as the speed with which the tilt angle is changing may indicate an increasing likelihood of a rollover. In some cases, a critical angle 201 may be used to determine whether the vehicle's tilt has become dangerous. As a specific example, a potential rollover event 200 may be detected when a tilt angle surpasses 15 degrees.

Other factors which may define a potential rollover event 200 include, but are not limited to, variations in the road 202 surface, wind (e.g. differentiating vehicle sway due to wind from sway due to a shifting load, etc.), and a specified height for the center of gravity of a load.

A critical angle 201 may be a tilt angle beyond which a rollover event 200 is likely to happen. According to various embodiments, the critical angle 201 may vary depending upon the vehicle's geometry, load size, and how the load is loaded (e.g. is the load top heavy, etc.). In some embodiments, the critical angle 201 may be provided to the rollover prevention system 600. In other embodiments, the critical angle 201 may be automatically determined by the rollover prevention system 600, using information collected from one or more sensors combined with known data.

A road 202 may be a specially prepared surface that vehicles can use to travel from one place to another. A lane 204 may be a division of a road 202, often marked off with painted lines, and meant to separate lines of traffic. A plurality of wheels 206 may be the wheels of a vehicle along one side. An upward angle 208 may be an angle which results in the primary hydraulic cylinder 102 pointing away from the surface the plurality of wheels 206 is resting on. A lane 204 size may be the width of a lane 204 on a road 202. The width of vehicle lanes 204 may vary from 9 to 15 feet.

A camber angle 210 is the angle made by the wheels of a vehicle; specifically, it is the angle between the vertical axis of the wheels and the vertical axis of the vehicle when viewed from the front or rear. A negative camber angle 210 means that the bottom of the wheel is farther out from the vehicle than the top.

As shown, the retracted rollover prevention apparatus 100 is substantially in line with the rest of the wheels on the vehicle, minimize the degree to which it encroaches into the lane 204, or even a neighboring lane 204. Depending on the vehicle, there may be multiple rollover prevention apparatus 100es on a side of the vehicle. In one embodiment, the retracted stabilizing wheel 108 may be just a few inches off above the road 202 when not in use.

As depicted in FIG. 2, a rollover event 200 may cause or require the deployment of the rollover prevention apparatus 100. In accordance with one embodiment, deployment of the apparatus comprises extending the primary hydraulic cylinder 102 to kick out the stabilizing wheel 108, and extending the secondary hydraulic cylinder 104 to push into the road 202, tipping the vehicle against the rollover. In various embodiments, the second hydraulic cylinder does not have to be strong enough to hold the entire weight of the vehicle, simply strong enough to tip it back over before it reaches a point of no return, resulting in a rollover.

Figure 3:
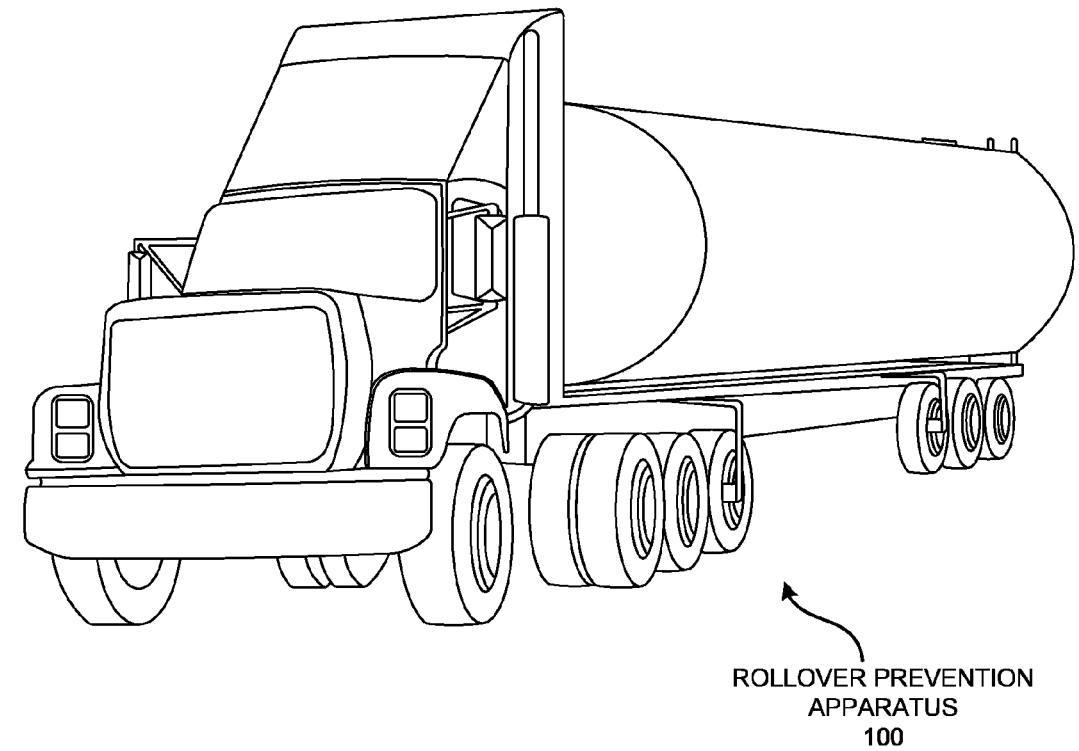
FIG. 3 is a vehicle view of the rollover prevention apparatus of FIG. 1 retracted and extended from a tanker truck, according to one embodiment.
Figure 3:
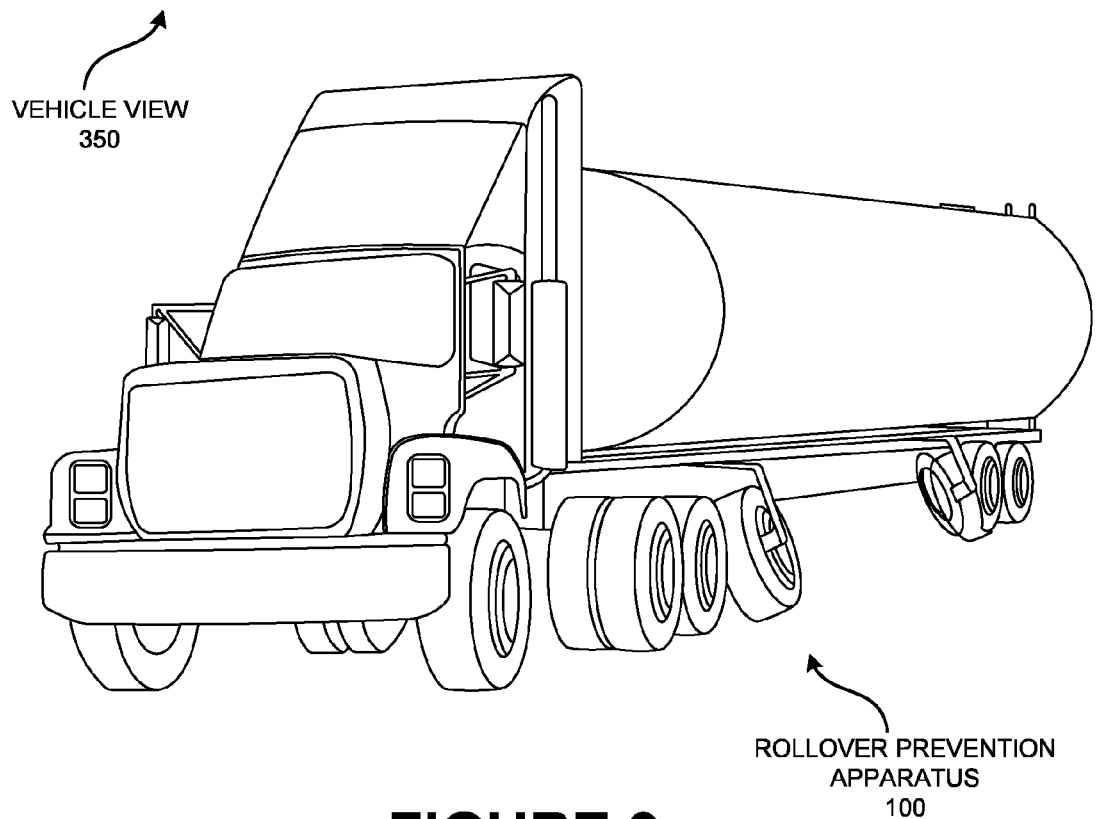
Figure 4:
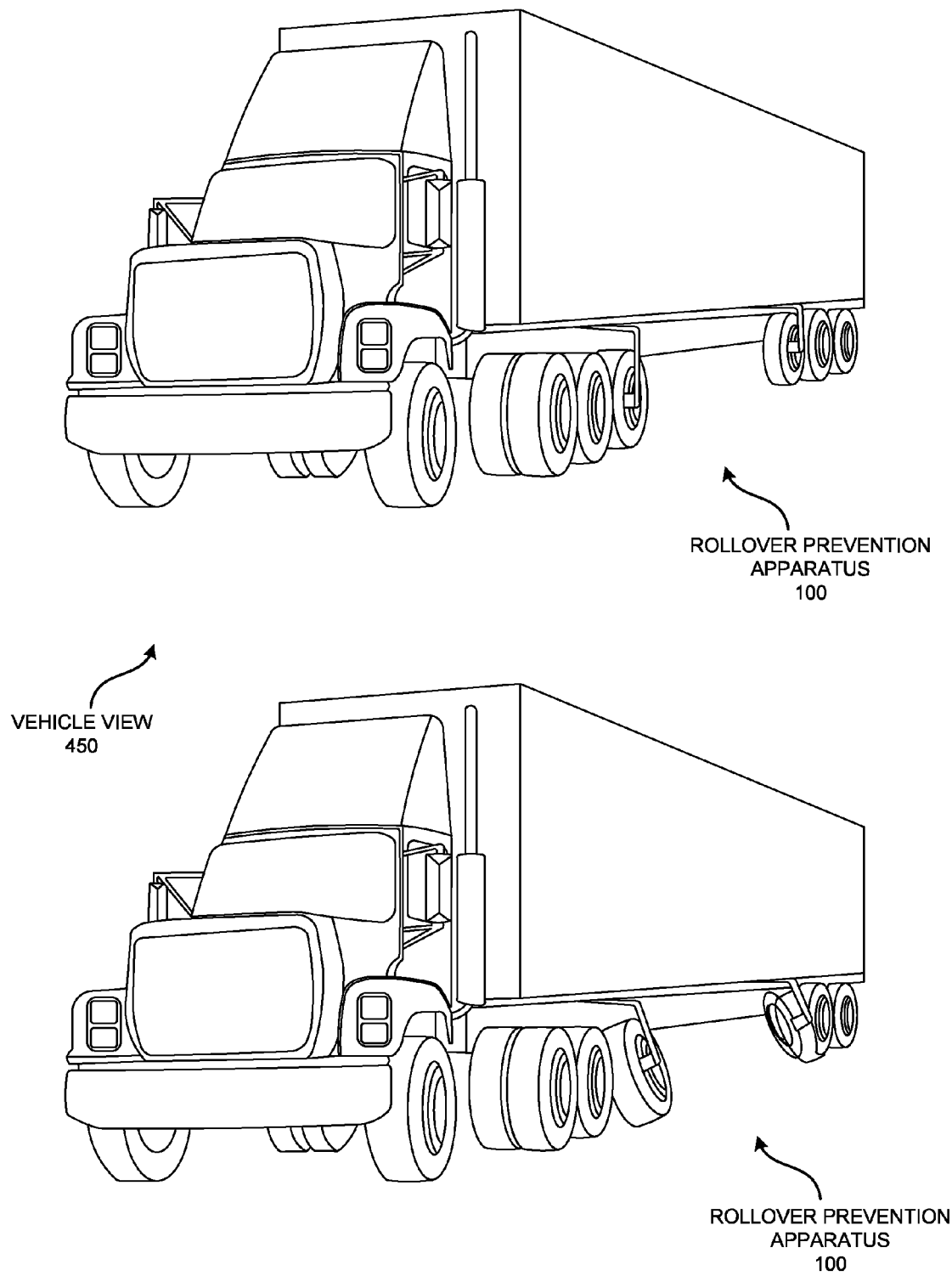
FIG. 4 is a vehicle view of the rollover prevention apparatus of FIG. 1 retracted and extended from a semi-trailer truck, according to one embodiment.
Figure 5:
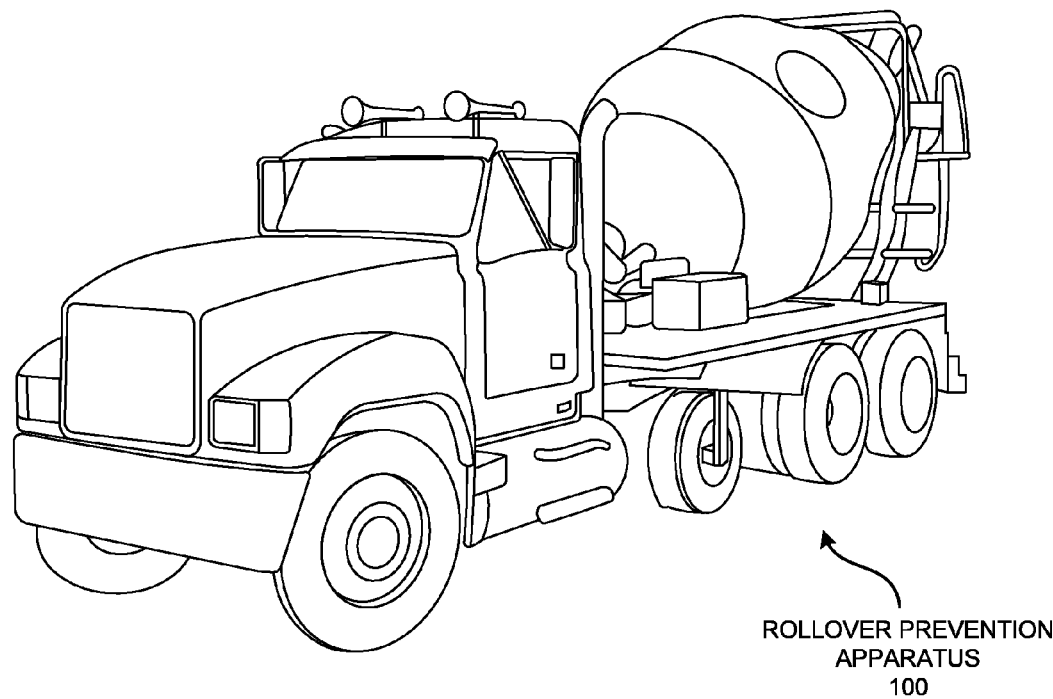
FIG. 5 is a vehicle view of the rollover prevention apparatus of FIG. 1 retracted and extended from a cement mixer truck, according to one embodiment.
Figure 5:
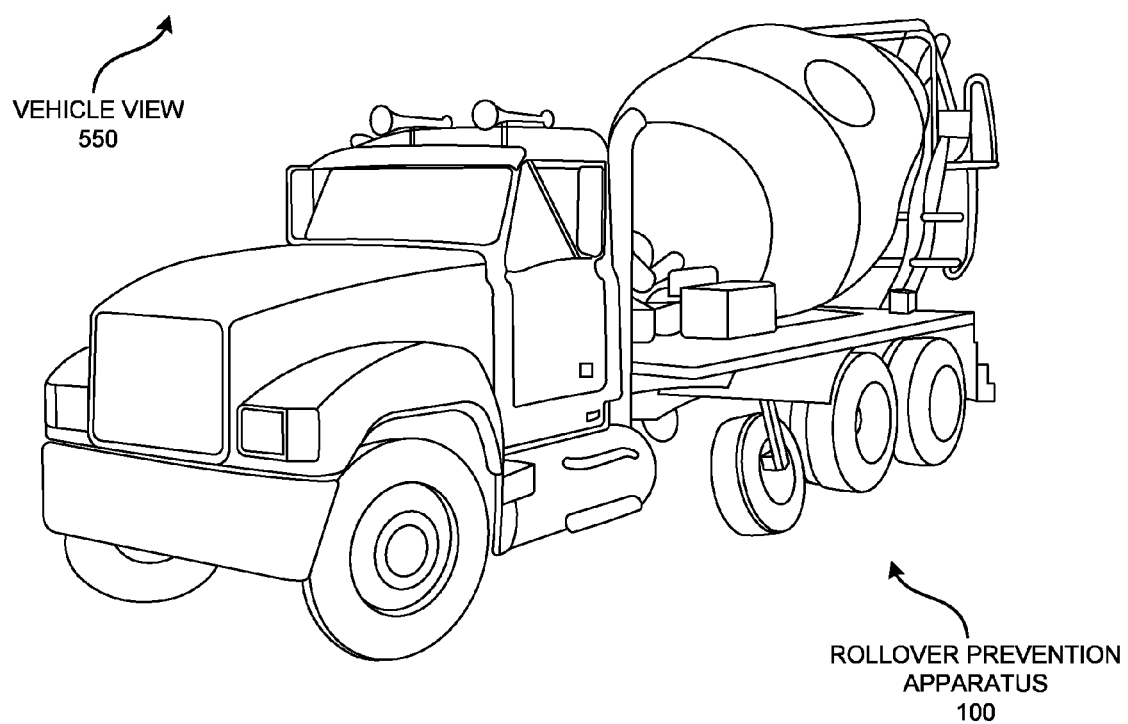

FIG. 3 is a vehicle view of the rollover prevention apparatus 100 of FIG. 1 retracted and extended from a tanker truck, according to one embodiment. Tanker trucks are particularly susceptible to rollovers, as they have a high center of gravity and the liquid cargo moves around during transit, making it easy to become off balance. FIG. 4 is a vehicle view of the rollover prevention apparatus 100 of FIG. 1 retracted and extended from a semi-trailer truck, according to one embodiment. Furthermore, FIG. 5 is a vehicle view of the rollover prevention apparatus 100 of FIG. 1 retracted and extended from a cement mixer truck, according to one embodiment.

Figure 6:
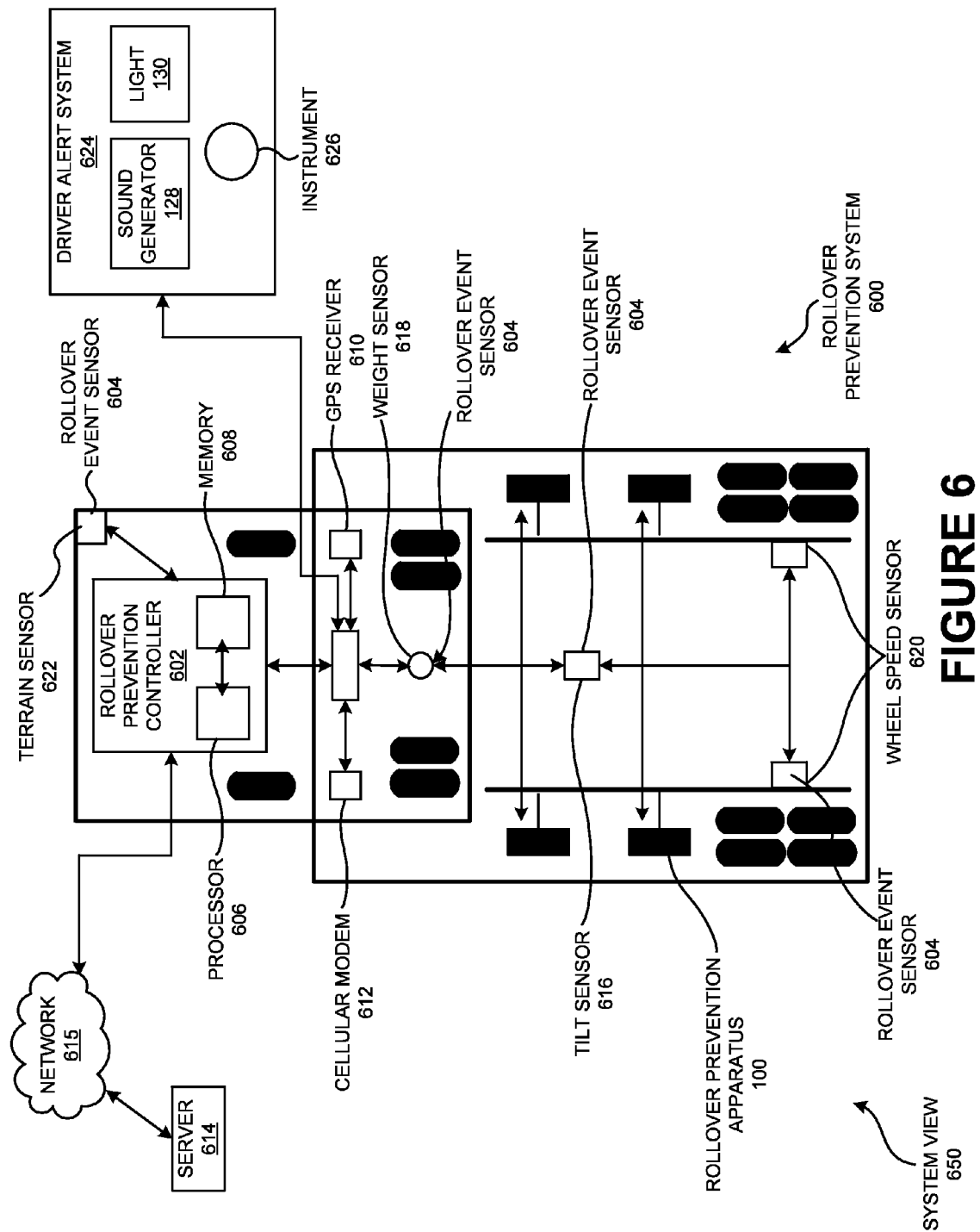
FIG. 6 is a system view illustrating a rollover prevention system comprising a rollover prevention controller, a plurality of rollover event sensors, and a plurality of rollover prevention apparatuses of FIG. 1, according to one embodiment.

FIG. 6 is a system view illustrating a rollover prevention system 600 comprising a rollover prevention controller 602, a plurality of rollover event sensors 604, and a plurality of rollover prevention apparatus 100es of FIG. 1, according to one embodiment. Particularly, FIG. 6 illustrates a rollover prevention system 600, a rollover prevention controller 602, a rollover event sensor 604, a processor 606, a memory 608, a GPS receiver 610, a cellular modem 612, a server, a tilt sensor 616, a plurality of weight sensors 618, a plurality of wheel speed sensors 620, a terrain sensor 622, a driver alert system 624, an instrument 626, as well as the rollover prevention apparatus 100 of FIG. 1, according to one embodiment.

A rollover prevention controller 602 may be a computer device which accepts signals from one or more rollover event sensors 604, determines whether a rollover event 200 is likely, and may automatically activate or deploy a rollover prevention apparatus 100, according to various embodiments. A rollover prevention controller 602 may also make use of a GPS receiver 610 and a cellular modem 612 to report events and action related to a real or potential rollover event 200.

A rollover event sensor 604 may be a sensor which provides information that may be used to determine whether a rollover event 200 is likely or not. rollover event sensors 604 may include, but are not limited to, a tilt sensor 616, a weight sensor 618, a wheel speed sensor 620, and a terrain sensor 622.

A processor 606 may be a central processing unit which is capable of performing calculations and executing programmed instructions. A memory 608 may be a device used to store information for use in a computer. A GPS receiver 610 may be a device which can determine its geographic location using timing signals from satellites. A cellular modem 612 may be a device which permits the transmission and reception of data through a wireless cellular network.

A server may be a computer or computer program that manages access to a centralized resource or service in a network. An example may be a networked computer located at a central dispatch which contains information related to a fleet of commercial vehicles. A tilt sensor 616 may be a sensor which can determine the tilt angle of a vehicle. The tilt angle is the deviation of the vehicle normal from the vector representing the earths gravitational pull. Examples of tilt sensor 616 technology include, but are not limited to, mercury switches, accelerometers, gyroscopes, and inclinometers.

A weight sensor 618 may be a device which may determine the amount of weight being exerted on a particular part of a vehicle. For example, a weight sensor 618 above the fifth wheel of a tractor trailer may indicate the weight of the front of the trailer. Types of weight sensors 618 may include, but are not limited to, electronic strain gauge, spring, and hydraulic. A wheel speed sensor 620 may be a device which can determine the rate of rotation of one or more wheels. A wheel sensor may be employed to detect potential rollover events 200 by comparing the speed of wheel on opposing sides of the vehicle. For example, if a truck were starting to tip, the wheels on one side will have less contact with the road 202 than those on the other side, causing a speed differential.

A terrain sensor 622 may be a sensor which may detect variations in the topology of a road 202 surface. This information may be used to predict potential rollovers. For example, a terrain sensor 622 may detect that the camber of the road 202 ahead of the vehicle is more severe than one would expect, and may cause a rollover at the vehicles current speed. A driver alert system 624 may be a device or collection of devices whose purpose is to notify the driver of a vehicle of an important, or potentially dangerous event.

An instrument 626 may be a device which conveys information in a visual manner. One example of an instrument 626 may be a gauge. In various embodiments, the driver of a vehicle equipped with a rollover prevention system 600 may have a gauge on the dashboard which indicates the proximity of a potential rollover event 200 (e.g. the tilt of a trailer, the shifting of cargo, approaching variations in the surface of the road 202, etc.) In other embodiments, such information may be conveyed using other types of instrument 626s, including, but not limited to, LCD displays.

As shown, the rollover prevention controller 602 is communicatively coupled to a plurality of rollover event sensors 604, a GPS receiver 610, a cellular modem 612, a server (through a network), a plurality of rollover prevention apparatus 100es, as well as a driver alert system 624. In various embodiments, the system may utilized a number of different forms of stimuli to inform the driver of a potential rollover event 200. As an option, these stimuli may be utilized to ensure the driver has not fallen asleep.

Figure 7:
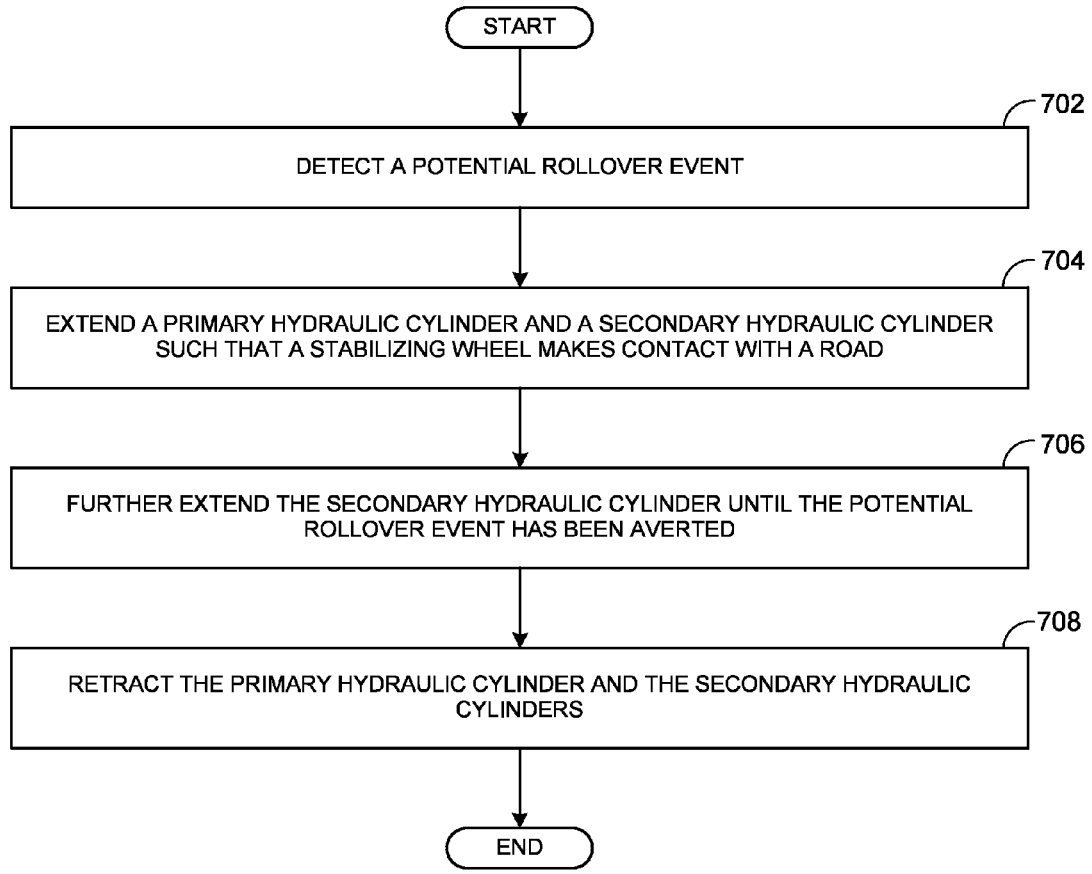
FIG. 7 is a process flow diagram of a method to prevent a rollover using the apparatus of FIG. 1, according to one embodiment.
Figure 8:
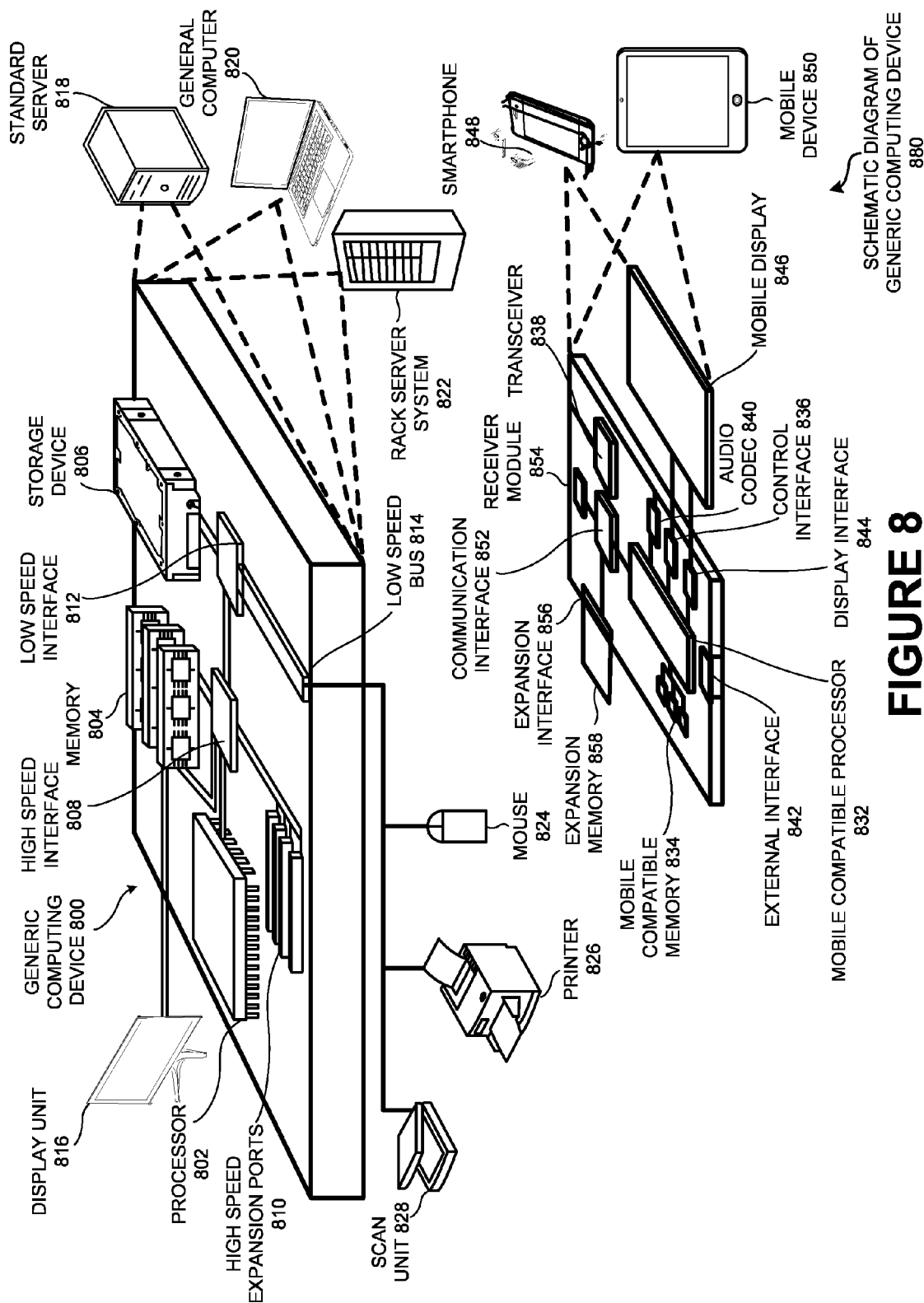
FIG. 8 is a schematic diagram of exemplary data processing devices that can be used to implement the methods and systems disclosed herein, according to one embodiment.

FIG. 7 is a process flow diagram of a method to prevent a rollover using the apparatus of FIG. 1, according to one embodiment. In operation 702, a potential rollover event 200 may be detected. In operation 704, a primary hydraulic cylinder 102 and a secondary hydraulic cylinder 104 may be extended such that a stabilizing wheel 108 makes contact with a road 202. In operation 706, the secondary hydraulic cylinder 104 may be further extended until the potential rollover event 200 has been averted. As an option, the distance which the cylinders are extended may depend upon the circumstances of the vehicle, and the road 202 on which it is on. For example, in one embodiment, sensors may determine the width of the lane 204 the vehicle is traveling in, and adjust the distances to ensure the apparatus does not encroach on the neighboring lane 204 of traffic. In operation 708, the primary hydraulic cylinder 102 and the secondary hydraulic cylinder 104 may be retracted FIG. 8 is a schematic diagram of generic computing device 880 that can be used to implement the methods and systems disclosed herein, according to one or more embodiments. FIG. 8 is a schematic diagram of generic computing device 880 and a mobile device 850 that can be used to perform and/or implement any of the embodiments disclosed herein. In one or more embodiments, rollover prevention controller 602 of FIG. 6 may be the generic computing device 800.

The generic computing device 800 may represent various forms of digital computers, such as laptops, desktops, workstations, personal digital assistants, servers, blade servers, mainframes, and/or other appropriate computers. The mobile device 850 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed, according to one embodiment.

The generic computing device 800 may include a processor 802, a memory 804, a storage device 806, a high speed interface 808 coupled to the memory 804 and a plurality of high speed expansion ports 810, and a low speed interface 812 coupled to a low speed bus 814 and a storage device 806. In one embodiment, each of the components heretofore may be inter-coupled using various buses, and may be mounted on a common motherboard and/or in other manners as appropriate. The processor 802 may process instructions for execution in the generic computing device 800, including instructions stored in the memory 804 and/or on the storage device 806 to display a graphical information for a GUI on an external input/output device, such as a display unit 816 coupled to the high speed interface 808.

In other embodiments, multiple processors and/or multiple buses may be used, as appropriate, along with multiple memories and/or types of memory. Also, a plurality of computing device 800 may be coupled with, with each device providing portions of the necessary operations (e.g., as a server bank, a group of blade servers, and/or a multi-processor system).

The memory 804 may be coupled to the generic computing device 800. In one embodiment, the memory 804 may be a volatile memory. In another embodiment, the memory 804 may be a non-volatile memory. The memory 804 may also be another form of computer-readable medium, such as a magnetic and/or an optical disk. The storage device 806 may be capable of providing mass storage for the generic computing device 800. In one embodiment, the storage device 806 may be includes a floppy disk device, a hard disk device, an optical disk device, a tape device, a flash memory and/or other similar solid state memory device. In another embodiment, the storage device 806 may be an array of the devices in a computer-readable medium previously mentioned heretofore, computer-readable medium, such as, and/or an array of devices, including devices in a storage area network and/or other configurations.

A computer program may be comprised of instructions that, when executed, perform one or more methods, such as those described above. The instructions may be stored in the memory 804, the storage device 806, a memory coupled to the processor 802, and/or a propagated signal.

The high speed interface 808 may manage bandwidth-intensive operations for the generic computing device 800, while the low speed interface 812 may manage lower bandwidth-intensive operations. Such allocation of functions is exemplary only. In one embodiment, the high speed interface 808 may be coupled to the memory 804, the display unit 816 (e.g., through a graphics processor and/or an accelerator), and to the plurality of high speed expansion ports 810, which may accept various expansion cards.

In the embodiment, the low speed interface 812 may be coupled to the storage device 806 and the low speed bus 814. The low speed bus 814 may be comprised of a wired and/or wireless communication port (e.g., a Universal Serial Bus ("USB"), a Bluetooth® port, an Ethernet port, and/or a wireless Ethernet port). The low speed bus 814 may also be coupled to the scan unit 828, a printer 826, a keyboard, a mouse 824, and a networking device (e.g., a switch and/or a router) through a network adapter.

The generic computing device 800 may be implemented in a number of different forms, as shown in the figure. In one embodiment, the computing device 800 may be implemented as a standard server 818 and/or a group of such servers. In another embodiment, the generic computing device 800 may be implemented as part of a rack server system 822. In yet another embodiment, the generic computing device 800 may be implemented as a general computer 820 such as a laptop or desktop computer. Alternatively, a component from the generic computing device 800 may be combined with another component in a mobile device 850. In one or more embodiments, an entire system may be made up of a plurality of generic computing device 800 and/or a plurality of generic computing device 800 coupled to a plurality of mobile device 850.

In one embodiment, the mobile device 850 may include a mobile compatible processor 832, a mobile compatible memory 834, and an input/output device such as a mobile display 846, a communication interface 852, and a transceiver 838, among other components. The mobile device 850 may also be provided with a storage device, such as a microdrive or other device, to provide additional storage. In one embodiment, the components indicated heretofore are inter-coupled using various buses, and several of the components may be mounted on a common motherboard.

The mobile compatible processor 832 may execute instructions in the mobile device 850, including instructions stored in the mobile compatible memory 834. The mobile compatible processor 832 may be implemented as a chipset of chips that include separate and multiple analog and digital processors. The mobile compatible processor 832 may provide, for example, for coordination of the other components of the mobile device 850, such as control of user interfaces, applications run by the mobile device 850, and wireless communication by the mobile device 850.

The mobile compatible processor 832 may communicate with a user through the control interface 836 and the display interface 844 coupled to a mobile display 846. In one embodiment, the mobile display 846 may be a Thin-Film-Transistor Liquid Crystal Display ("TFT LCD"), an Organic Light Emitting Diode ("OLED") display, and another appropriate display technology. The display interface 844 may comprise appropriate circuitry for driving the mobile display 846 to present graphical and other information to a user. The control interface 836 may receive commands from a user and convert them for submission to the mobile compatible processor 832.

In addition, an external interface 842 may be provide in communication with the mobile compatible processor 832, so as to enable near area communication of the mobile device 850 with other devices. External interface 842 may provide, for example, for wired communication in some embodiments, or for wireless communication in other embodiments, and multiple interfaces may also be used.

The mobile compatible memory 834 may be coupled to the mobile device 850. The mobile compatible memory 834 may be implemented as a volatile memory and a non-volatile memory. The expansion memory 858 may also be coupled to the mobile device 850 through the expansion interface 856, which may comprise, for example, a Single In Line Memory Module ("SIMM") card interface. The expansion memory 858 may provide extra storage space for the mobile device 850, or may also store an application or other information for the mobile device 850.

Specifically, the expansion memory 858 may comprise instructions to carry out the processes described above. The expansion memory 858 may also comprise secure information. For example, the expansion memory 858 may be provided as a security module for the mobile device 850, and may be programmed with instructions that permit secure use of the mobile device 850. In addition, a secure application may be provided on the SIMM card, along with additional information, such as placing identifying information on the SIMM card in a non-hackable manner.

The mobile compatible memory may include a volatile memory (e.g., a flash memory) and a non-volatile memory (e.g., a non-volatile random-access memory ("NVRAM")). In one embodiment, a computer program comprises a set of instructions that, when executed, perform one or more methods. The set of instructions may be stored on the mobile compatible memory 834, the expansion memory 858, a memory coupled to the mobile compatible processor 832, and a propagated signal that may be received, for example, over the transceiver 838 and/or the external interface 842.

The mobile device 850 may communicate wirelessly through the communication interface 852, which may be comprised of a digital signal processing circuitry. The communication interface 852 may provide for communications using various modes and/or protocols, such as, a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol.

Such communication may occur, for example, through the transceiver 838 (e.g., radio-frequency transceiver). In addition, short-range communication may occur, such as using a Bluetooth®, Wi-Fi, and/or other such transceiver. In addition, a GPS ("Global Positioning System") receiver module 854 may provide additional navigation-related and location-related wireless data to the mobile device 850, which may be used as appropriate by a software application running on the mobile device 850.

The mobile device 850 may also communicate audibly using an audio codec 840, which may receive spoken information from a user and convert it to usable digital information. The audio codec 840 may likewise generate audible sound for a user, such as through a speaker (e.g., in a handset of the mobile device 850). Such a sound may comprise a sound from a voice telephone call, a recorded sound (e.g., a voice message, a music files, etc.) and may also include a sound generated by an application operating on the mobile device 850.

The mobile device 850 may be implemented in a number of different forms, as shown in the figure. In one embodiment, the mobile device 850 may be implemented as a smartphone 848. In another embodiment, the mobile device 850 may be implemented as a personal digital assistant ("PDA"). In yet another embodiment, the mobile device, 850 may be implemented as a tablet device.

Various embodiments of the systems and techniques described here can be realized in a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including one programmable processor, which may be special or general purpose, coupled to receive data and instructions from, and to transmit data and instructions to, a storage system, one input device, and one output device.

Various embodiments of the systems and techniques described here can be realized in a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system includes programmable processor, which may be special or general purpose, coupled to receive data and instructions from, and to transmit data and instructions to, a storage system, input device, and output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal ("LCD") monitor) for displaying information to the user and a keyboard and a mouse 824 by which the user can provide input to the computer. Other kinds of devices can be used to provide for interaction with a user as well; for example, feedback provided to the user can be any form of sensory feedback (e.g., visual feedback, auditory feedback, and/or tactile feedback) and input from the user can be received in any form, including acoustic, speech, and/or tactile input.

The systems and techniques described here may be implemented in a computing system that includes a back end component (e.g., as a data server), a middleware component (e.g., an application server), a front end component (e.g., a client computer having a graphical user interface, and/or a Web browser through which a user can interact with an embodiment of the systems and techniques described here), and a combination thereof. The components of the system may also be coupled through a communication network.

The communication network may include a local area network ("LAN") and a wide area network ("WAN") (e.g., the Internet). The computing system can include a client and a server. In one embodiment, the client and the server are remote from each other and interact through the communication network.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A rollover prevention apparatus, comprising:
a primary hydraulic cylinder attached to a frame bracket;
a secondary hydraulic cylinder attached to the primary hydraulic cylinder and a wheel bracket; and
at least one stabilizing wheel affixed to the wheel bracket,
wherein the frame bracket is affixed to a frame such that the primary hydraulic cylinder is at an upward angle,
wherein the at least one stabilizing wheel is substantially in line with a plurality of wheels affixed to the frame while the primary hydraulic cylinder and the secondary hydraulic cylinders are retracted, the line being substantially perpendicular to the primary hydraulic cylinder and the secondary hydraulic cylinders,
wherein the at least one stabilizing wheel has a negative camber angle with respect to the plurality of wheels while the primary hydraulic cylinder and the secondary hydraulic cylinders are retracted, and
wherein a rollover event may be averted by extending the primary hydraulic cylinder and the secondary hydraulic cylinders such that the stabilizing wheel makes contact with a road without substantially leaving a lane, and further using at least the secondary hydraulic cylinder to push against the road until the rollover event has been averted.

2. The apparatus of claim 1, further comprising:
a hydraulic power pack to pressurize a hydraulic fluid such that the hydraulic power pack to enable the primary hydraulic cylinder and the secondary hydraulic cylinder function as specified when the rollover event is detected;
a hydraulic fluid supply to provide the hydraulic fluid to the primary hydraulic cylinder and the secondary hydraulic cylinder; and
a compressed air tank to provide compressed air to the primary hydraulic cylinder and the secondary hydraulic cylinder to increase responsiveness when the rollover event is detected.

3. The apparatus of claim 1, further comprising an external warning system to alert nearby drivers when the apparatus is being used.

4. The apparatus of claim 1, further comprising a braking system connected to the at least one stabilizing wheel.

5. The apparatus of claim 1, wherein at least one of the primary hydraulic cylinder and the secondary hydraulic cylinder is an air-over-hydraulic cylinder.

6. The apparatus of claim 1, wherein at least one of an angle between the frame and the primary hydraulic cylinder and an angle between the primary hydraulic cylinder and the secondary hydraulic cylinder is adjustable.

7. A method of a rollover prevention system, comprising:
detecting a potential rollover event;
extending a primary hydraulic cylinder and a secondary hydraulic cylinder such that a stabilizing wheel makes contact with a road without substantially leaving a lane, wherein the primary hydraulic cylinder is attached to a frame bracket,
wherein the secondary hydraulic cylinder is attached to the primary hydraulic cylinder and a wheel bracket, and
wherein the frame bracket is affixed to a frame such that the primary hydraulic cylinder is at an upward angle;
further extending the secondary hydraulic cylinder to push against the road until the potential rollover event has been averted; and
retracting the primary hydraulic cylinder and the secondary hydraulic cylinders,
wherein the at least one stabilizing wheel is substantially in line with a plurality of wheels affixed to the frame while the primary hydraulic cylinder and the secondary hydraulic cylinders are retracted, the line being substantially perpendicular to the primary hydraulic cylinder and the secondary hydraulic cylinders, and
wherein the at least one stabilizing wheel has a negative camber angle with respect to the plurality of wheels while the primary hydraulic cylinder and the secondary hydraulic cylinders are retracted.

8. The method of claim 7, wherein the potential rollover event is detected using at least one of a tilt sensor, a plurality of weight sensors, a plurality of wheel speed sensors, and a terrain sensor.

9. The method of claim 7, further comprising:
determining a location using a GPS receiver; and
reporting the location to a server using a cellular modem in response to at least one of the potential rollover event and the extension of the hydraulic cylinders.

10. The method of claim 7, further comprising alerting a driver of the potential rollover event using at least one of a sound, a light, and an instrument.

11. The method of claim 7, further comprising alerting nearby drivers of the extending of the primary hydraulic cylinder and the secondary hydraulic cylinders using at least one of a sound generator and a light.

12. The method of claim 7, wherein the extension of the primary hydraulic cylinder and the secondary hydraulic cylinders is triggered automatically, in response to the detection of a potential rollover event.

13. The method of claim 7, wherein the primary hydraulic cylinder and the secondary hydraulic cylinders are extended distances which are determined by at least one of a critical angle, a lane size, and a load weight.

14. A rollover prevention system, comprising:
at least one rollover event sensor;
a rollover prevention controller, comprising a processor and a memory; and
at least one rollover prevention apparatus comprising:
a primary hydraulic cylinder attached to a frame bracket;
a secondary hydraulic cylinder attached to the primary hydraulic cylinder and a wheel bracket; and
at least one stabilizing wheel affixed to the wheel bracket,
wherein the frame bracket is affixed to a frame such that the primary hydraulic cylinder is at an upward angle,
wherein the at least one stabilizing wheel is substantially in line with a plurality of wheels affixed to the frame while the primary hydraulic cylinder and the secondary hydraulic cylinders are retracted, the line being substantially perpendicular to the primary hydraulic cylinder and the secondary hydraulic cylinders,
wherein the at least one stabilizing wheel has a negative camber angle with respect to the plurality of wheels while the primary hydraulic cylinder and the secondary hydraulic cylinders are retracted, and
wherein a rollover event may be averted by extending the primary hydraulic cylinder and the secondary hydraulic cylinders such that the stabilizing wheel makes contact with a road without substantially leaving a lane, and further using at least the secondary hydraulic cylinder to push against the road until the rollover event has been averted.

15. The system of claim 14, wherein the at least one rollover event sensor is at least one of a tilt sensor, a plurality of weight sensors, a plurality of wheel speed sensors, and a terrain sensor.

16. The system of claim 14, further comprising:
a GPS receiver to determine the location of the rollover prevention system; and
a cellular modem to report the location to a server,
wherein a location is determined using the GPS receiver, and
wherein the location is reported to the server using the cellular modem in response to at least one of a potential rollover event and the deployment of at least one rollover prevention apparatus.

17. The system of claim 14, further comprising:
a driver alert system comprising at least one of a sound generator, a light, and an instrument, configured to alert a driver of a potential rollover event.

18. The system of claim 14, further comprising:
an external warning system comprising at least one of a sound generator and a light, configured to alert nearby drivers when at least one rollover prevention apparatus is being deployed.

19. The system of claim 14, wherein the deployment of the at least one rollover prevention apparatus is triggered automatically by the rollover prevention controller, in response to the detection of a potential rollover event through the at least one rollover event sensor.

20. The system of claim 14, wherein the geometry of the at least one rollover prevention apparatus after being deployed is determined by at least one of a critical angle, a lane size, and a load weight.

* * * * *